(12) United States Patent
Scharf

(10) Patent No.: US 10,776,813 B2
(45) Date of Patent: Sep. 15, 2020

(54) USER SEGMENTATION BASED ON VIEW ABILITY OF CONTENT

(71) Applicant: ADOBE INC., San Jose, CA (US)

(72) Inventor: Matthew Ryan Scharf, San Francisco, CA (US)

(73) Assignee: ADOBE INC., San Jose, CA (US)

( * ) Notice: Subject to any disclaimer, the term of this patent is extended or adjusted under 35 U.S.C. 154(b) by 542 days.

(21) Appl. No.: 15/179,579

(22) Filed: Jun. 10, 2016

(65) Prior Publication Data
US 2017/0357998 A1 Dec. 14, 2017

(51) Int. Cl.
*G06Q 30/02* (2012.01)

(52) U.S. Cl.
CPC ..... *G06Q 30/0242* (2013.01); *G06Q 30/0277* (2013.01)

(58) Field of Classification Search
CPC ........................................ G06Q 30/00–30/0284
USPC ............................................. 705/14.1–14.73
See application file for complete search history.

(56) References Cited

U.S. PATENT DOCUMENTS

| | | | | |
|---|---|---|---|---|
| 2002/0188508 A1* | 12/2002 | Lee | .................... | G06Q 30/0255 705/14.53 |
| 2010/0287580 A1* | 11/2010 | Harding | ............. | H04N 21/8455 725/14 |
| 2015/0287097 A1* | 10/2015 | Umeda | .............. | G06Q 30/0275 705/14.71 |
| 2016/0078485 A1* | 3/2016 | Shim | ..................... | H04W 4/021 705/14.64 |
| 2016/0125453 A1* | 5/2016 | Shukla | ............... | G06Q 30/0244 705/14.45 |
| 2017/0093650 A1* | 3/2017 | Predovic | ................. | H04L 67/22 |
| 2017/0353564 A1* | 12/2017 | Zhou | ..................... | H04L 67/10 |

OTHER PUBLICATIONS

Chris Swanicke, "Adobe's Project Iceberg Looks Beneath the Surface of Attribution", Aug. 18, 2014, www.adexchanger.com/analytics/adobes-project-iceberg-looks-beneath-the-surface-of-attribution/, pp. 8 (Year: 2014).*
Matt Scharf, "The Forgotten Side of Viewability," Data-Driven Thinking, adexchanger.com, Published Mar. 20, 2014, 13 pages. Available at: http://www.adexchanger.com/data-driven-thinking/the-forgotten-side-of-viewability/.
Chris Swanicke, "Adobe's 'Project Iceberg' Looks Beneath the Surface of Attribution," adexchanger.com, Published Aug. 18, 2014, 8 pages. Available at: http://www.adexchanger.com/analytics/adobes-project-iceberg-looks-beneath-the-surface-of-attribution/.

(Continued)

*Primary Examiner* — John Van Bramer
(74) *Attorney, Agent, or Firm* — Shook, Hardy & Bacon LLP

(57) ABSTRACT

Systems and methods provide for user segmentation based on viewability of content displayed on user devices during content impressions. Pixel tags are launched when content is displayed on user devices to capture viewability data for a number of different viewability ranges. The viewability data for each content impression is associated with a unique user identifier (UUID). A segment definition sets forth criteria for a user segment based on viewability, and the user segment is generated by including UUIDs associated with viewability data satisfying the segment definition.

20 Claims, 7 Drawing Sheets

(56) References Cited

OTHER PUBLICATIONS

Matt Scharf, "Out-Of-View Impressions Can Be Valuable," Data-Driven Thinking, adexchanger.com, Published Jan. 8, 2015, 16 pages. Available at: http://adexchanger.com/data-driven-thinking/out-of-view-impressions-can-be-valuable/.

"Casual Impact, a Breakthrough in Conversion Measurement," Integral Ad Science, Inc., 4 pages. Last accessed Jun. 10, 2016 at: https://integralads.com/solutions/causal-impact/.

* cited by examiner

| UUID | 0 – 9% | 10 – 19% | 20 – 29% | ... |
|------|--------|----------|----------|-----|
| 123  | 1.3    | 1.2      | 0.1      |     |
| 456  | 0.4    | 0.7      | 1.1      |     |
| 789  | 1.9    | 1.5      | 1.3      |     |
| 101  | 0.1    | 0.2      | 1.4      |     |
| 112  | 2.5    | 0.3      | 0.1      |     |
| 131  | 0.6    | 0.4      | 1.6      |     |
| 415  | 0.9    | 1.1      | 0.2      |     |

*FIG. 2A.*

| UUID | 0 – 9% | 10 – 19% | 20 – 29% | ... |
|------|--------|----------|----------|-----|
| 123  | YES    | YES      | NO       |     |
| 456  | NO     | NO       | YES      |     |
| 789  | YES    | YES      | YES      |     |
| 101  | NO     | NO       | YES      |     |
| 112  | YES    | NO       | NO       |     |
| 131  | NO     | NO       | YES      |     |
| 415  | NO     | YES      | NO       |     |

*FIG. 2B.*

USER SEGMENTATION BASED ON VIEW ABILITY OF CONTENT

BACKGROUND

It is difficult for marketers to quantify whether digital marketing spend is driving desired user actions for their business (e.g., product purchases). The reason is because a subset of every marketer's audience that is exposed to the marketer's content (e.g., an advertisement) would possibly convert on the marketer's desired action without the need for the marketing exposure in the first place. To quantify the incremental contribution that digital marketing has for a marketer's business, marketers have traditionally performed studies, often referred to as media effectiveness studies, true-lift analyses, or view-through analyses. These studies are used to determine a percentage of users in a test group who performed a conversion (e.g., purchased a product) compared to a percentage of users in a control group who also performed the conversion. The users are segmented into the test group and control groups based on what content is delivered to each user. Users in the test group receive the marketer's content, while users in the control group receive some content unrelated to the marketer's business. Segmenting users in this way to quantify incremental contribution of digital marketing takes a lot of time, resources, expertise, analysis, and purposefully wasted media spend just to arrive at a conclusion that is flawed and far too binary to be applied to the complicated nature of human reaction to the billions of different permutations of marketing exposure and the various impacts that those permutations may have on a consumer.

SUMMARY

Embodiments of the present invention relate to, among other things, performing user segmentation based on the viewability of content (i.e., the extent to which the content is displayed on user devices). In accordance with some embodiments, impression data is received via pixel tags delivered for a number of content impressions on user devices. The impression data for each content impression includes the assignment of a unique user identifier (UUID) and viewability data. The viewability data includes a time value corresponding to a length of time that associated content was displayed on a user device for each of a number of predefined viewability ranges. A segment definition is accessed that includes a criterion specifying a required value for a first viewability range from the plurality of predefined viewability ranges. Impression data that includes viewability data satisfying the required value for the first viewability range is identified, and a user segment is generated that includes a set of UUIDs from the identified impression data. Thus, the user segment represents a collection of UUIDs that was served an impression that meets defined viewability criteria used to define the segment.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

The present invention is described in detail below with reference to the attached drawing figures, wherein:

FIGS. 2A and 2B are tables illustrating impression data for content impressions in accordance with some implementations of the present disclosure;

DETAILED DESCRIPTION

Figure 1:
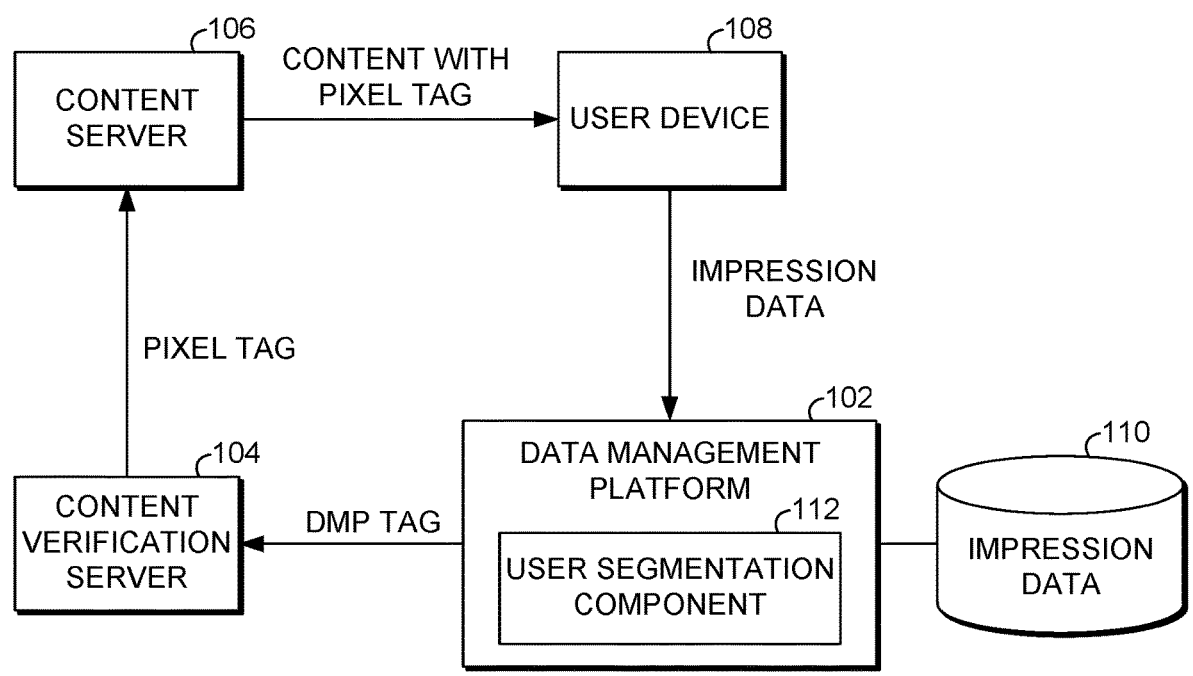
FIG. 1 is a block diagram illustrating an exemplary system in accordance with some implementations of the present disclosure.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Various terms are used throughout this description. Definitions of some terms are included below to provide a clearer understanding of the ideas disclosed herein:

The term "content impression" is used herein to refer to delivery of content for display on a user device. Content can be delivered for display within any of a number of different environments within the scope of embodiments herein. For instance, content can be delivered for display: on a webpage, within search results, within a game, within a mobile app, or within a productivity application (e.g., a word processor application), to name a few.

The term "viewability" represents a percentage of content that is displayed on a user device. For example, if the top half of content is displayed on a user device (with the bottom half being off screen), the content would have a viewability of 50 percent.

The term "pixel tag" refers to code that is triggered when associated content is displayed on a user device in order to collect impression data. A pixel tag sets forth various attributes and causes the collection of values for the attributes to provide the impression data. The attributes specified by a pixel tag include viewability attributes. Each viewability attribute corresponds with a range of viewability (e.g., 0-9 percent, 10-19 percent, 20-29 percent, etc.). A viewability attribute may specify collection of a value corresponding to either: (1) a length of time the content is displayed in a particular viewability range; or (2) whether the content is displayed in a particular viewability range for a threshold period of time set forth by the viewability attribute (e.g., one second). A pixel tag may specify a number of attributes beyond viewability attributes, such as metadata classifying: an advertising campaign identifier; information identifying a location (e.g., webpage) at which the content was delivered; a content identifier; location of user/user device; time of content impression, targeting information for content impression being sent to user; and content dimensions.

The term "impression data" refers to data collected about a content impression via a pixel tag. In accordance with embodiments described herein, the impression data includes a unique user identifier (UUID) and a value for each attribute specified by the pixel tag. As is known in the art, UUIDs can be used to anonymously track unique users or user devices. For instance, a cookie can be used to track or map to a UUID.

The term "viewability data" is used herein to refer to the portion of impression data corresponding to viewability attributes specified by a pixel tag. The viewability data includes a value for each viewability attribute corresponding to a different range of viewability. In some configurations, the value collected for a viewability attribute is a length of time the content was displayed within the corresponding viewability range. For instance, one piece of viewability data could indicate that 40-49 percent of the content was viewable on the user device for 0.5 seconds. In other words, the viewability data captured is done so in the form of key-value pairs. The key is the viewability range and the value is the duration in seconds that the content was in the viewable space of the end user's screen. In other configurations, viewability attributes may specify a threshold length of time (e.g., one second), and the value collected for a viewability attribute is whether the content was displayed within the corresponding viewability range for the threshold length of time. For instance, one piece of viewability data could indicate whether 40-49 percent of the content was viewable for a threshold length of time of at least one second.

A "user segment" is used herein to refer to a collection of unique users or user devices having some similar characteristic(s) that differentiates the users/user devices from other users/user devices. The unique users or user devices in a user segment are identified herein by UUIDs. Thus, a user segment includes a collection of UUIDs. The UUIDs for a user segment are identified using a "segment definition." A segment definition sets forth at least one criterion for selecting UUIDs for a user segment based on impression data. Each criterion in the segment definition specifies a required value for a given attribute in the impression data. For example, suppose a user segment corresponds to unique users who have received a content impression in which 80-89 percent of the content was viewable for at least one second. A segment definition would specify a required value of at least one second for an attribute corresponding to a viewability range of 80-89 percent. Using this segment definition, UUIDs associated with content impressions having impression data indicating that content was displayed in the 80-89 percent viewability range for at least one second would be included in the user segment. In some configurations, a segment definition for a user segment specifies one or more traits (defined below), and the user segment includes UUIDs associated with those traits.

A "trait" refers to a collection of UUIDs that satisfy a trait definition. A "trait definition" is similar to a segment definition in that it sets forth at least one criterion for identifying UUIDs based on impression data. Traits are predefined before impression data is received such that UUIDs can be assigned to traits as impression data is received for each content impression. More particularly, when impression data is received for a given content impression, the UUID for that content impression is associated with each trait for which the impression data satisfies a corresponding trait definition. For example, traits could be predefined such that each trait corresponds with content being viewable in each viewability range for at least one second (e.g., a first trait corresponds with 0-9 percent of content being viewable for at least one second, a second trait corresponds with 10-19 percent of content being viewable for at least one second, etc.). Suppose impression data is received for a content impression in which the content was displayed for at least one second in each of the 60-69 percent and 80-89 percent viewability ranges. As such, the UUID for the content impression would be associated with two traits—one associated with the 60-69 percent viewability range and another associated with the 80-89 percent viewability range. Thus, each trait includes a list of zero or more UUIDs. When traits are used, a segment definition for a user segment can simply identify one or more traits (which can be combined using Boolean operators). Accordingly, the UUIDs for the user segment would include UUIDs identified for the trait(s) specified by the segment definition.

The approach to user segmentation traditionally used to assess the contribution of digital marketing to a marketer's business has a number of flaws. First, it takes a large amount of effort to set up the platform to distribute different content to different users. Additionally, marketing spend is wasted in serving control content that is unrelated to the marketer's business. The data collected is imprecise as users may bleed from one group to another, for instance, when users in the control group inadvertently receive the marketer's content or when users in the target group don't actually see the marketer's content because the content was delivered and classified as a served impression but not displayed or only partially displayed on the user's device. Further, an expert is required to analyze the data, which is typically expensive and time consuming.

In addition, the traditional approach to evaluate the effectiveness of digital marketing is based upon impression data that is defined as a served content exposure event being recorded in a marketer's dataset. But the reality is that not all served content impressions are equal in value and one of the most important reasons is that not all served content are actually in the viewable space of the end user's screen. So traditional studies are inherently flawed due to evaluating data that is not accompanied by details on the content impression's viewability or how much of the content was viewable and what was the corresponding message in that portion of the content that was rendered viewable. As a result, the data available to marketers, albeit rich and detailed, could be misleading unless the data is enhanced with meaningful details about the nature of each served content impression. Evaluating the impact of marketing messages on an end user is only as good as the data captured about the marketing messages served to that end user.

Embodiments of the present invention address the technical challenge of user segmentation in assessing digital marketing by providing an approach to user segmentation based on the viewability of marketer's content displayed on user devices. The viewability reflects the percentage of the content that was displayed on the user devices. Generally, embodiments collect data for different ranges of viewability (e.g., 0-9 percent of the content displayed, 10-19 percent of the content displayed, 20-29 percent of the content displayed, etc.) for each content impression. The viewability data is then used to segment users based on different exposure to the content reflected by the viewability data.

More particularly, in accordance with embodiments of the present invention, pixel tags are used to collect viewability data regarding the extent to which content is displayed on user devices during content impressions. The pixel tags comprise code that is launched on user devices when content is rendered on the devices. The pixel tags set forth viewability attributes for collecting the viewability data. Each viewability attribute corresponds with a different viewability range. The pixel tags may also set forth other types of attributes for collecting additional impression data for each content impression.

When pixel tags are launched on user devices, impression data is collected and returned to a data management platform with a unique user identifier (UUID) for each user or user device corresponding to each content impression and a value for each attribute set forth by the pixel tags. Data is received and stored at the content impression level (i.e., each UUID identified corresponds to the impression data captured at the time of the content impression). The impression data includes viewability data, which comprises time values based on a length of time content was displayed on a user device within each viewability range. For instance, the viewability data for a given content impression could indicate that 0-9 percent of the content was displayed for 0.5 seconds, 10-19 percent of the content was displayed for 1.2 seconds, 20-29 percent of the content was displayed for 0.6 seconds, etc. Alternatively, the viewability data can indicate whether the content was displayed within each viewability range for a threshold period of time (e.g., one second).

To segment users based on the viewability data, a segment definition sets forth criteria specifying a required value for at least one viewability range. For instance, a segment definition could require that 90-100 percent of the content was displayed for one second. Content impressions with viewability data satisfying the segment definition are identified, and the UUIDs from those content impressions are included in the user segment.

In further configurations, a number of traits are pre-built specifying criteria for identifying content impressions with specific viewability data. As such, UUIDs can be assigned to traits when viewability data is received from content impressions. To generate a user segment, one or more traits are specified such that the user segment includes UUIDs assigned to the trait(s). Using pre-built traits allows for user segmentation to occur in the background (e.g., in real-time) as data is received from content impressions.

By using viewability to segment users, embodiments described herein provide a number of advantages. There is no need for analysis after data is captured as user segmentation occurs based on segment definitions and collected viewability data. Additionally, as viewability data is continuously collected from content impressions, the approach provides an always-on view of performance, and is not limited to a static period in the past. Further, embodiments described herein are not limited to a binary view (e.g., content delivered to test group and content not delivered to control group). Instead, a variety of different user segments can be defined based on different levels of viewability, thereby allowing for a number of different test groups.

With reference now to the drawings, FIG. 1 is a block diagram illustrating an exemplary system 100 for user segmentation based on viewability data in accordance with implementations of the present disclosure. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

The system 100 is an example of a suitable architecture for implementing certain aspects of the present disclosure. Among other components not shown, the system 100 includes a data management platform 102, a content verification server 104, a content server 106, and a user device 108.

Initially, the data management platform 102 provides, to the content verification server 104, information specifying attributes for collecting impression data when content is delivered to user devices, such as the user device 108. The information may be provided using a data management platform tag, which sets forth the various attributes. In some configurations, a number of default attributes are specified. In other configurations, a data management platform user specifies at least some of the attributes. For instance, the data management platform user may wish to segment users based on different attributes and, as such, specifies the attributes for which to collect impression data when content is delivered to user devices.

In accordance with embodiments herein, the attributes at least include a number of viewability attributes. Each viewability attribute corresponds with a different range of viewability, which represents the percentage of content that is displayed on a user device. By way of example only and not limitation, the different viewability ranges could be: 1-9 percent; 10-19 percent; 20-29 percent; 30-39 percent; 40-49 percent; 50-59 percent; 60-69 percent; 70-79 percent; 80-89 percent; 90-99 percent; and 100 percent. It should be understood that any of a variety of different viewability ranges may be employed within the scope of embodiments herein. Each viewability attribute also specifies a time component, which either indicates to capture a length of time content is displayed within the corresponding viewability range or whether the content was displayed within the corresponding viewability range for a threshold period of time (e.g., one second).

A variety of other attributes can be specified in addition to the viewability attributes. Any attribute that may be useful to segment user populations could be specified. By way of example only and not limitation, the other attributes can include: an advertising campaign identifier; information identifying a location (e.g., webpage) at which the content was delivered; a content identifier; location of user/user device; time of content impression, targeting information used to decide to send content to user; measured indications of a bot versus human operated device; and content dimensions.

Based on the attributes specified by the data management platform 102, the content verification server 104 generates a pixel tag. The pixel tag comprises code that is triggered when associated content is displayed on a user device in order to collect impression data for the associated content based on the specified attributes. The pixel tag is provided to a content server 106, such that the pixel tag can be delivered to user devices with content. For instance, as shown in FIG. 1, content is provided to the user device 108 with the pixel tag.

When the content is displayed on the user device 108, the pixel tag is launched in order to collect impression data based on the specified attributes. In particular, the pixel tag assigns and records a UUID to uniquely identify the user/user device and a value for each attribute if a value exists based upon how the content was rendered on the screen of the user device. This includes collecting viewability data, which captures a time value for each viewability attribute. The time value collected for each viewability attribute can be a length of time the content was displayed within a corresponding viewability range (i.e., a continuous number). Then, within the data management platform 102, the marketer can define whether the user qualifies for a trait or segment depending on whether the UUID assigned to the user's device has corresponding values in the viewability range fields that meet the trait or segment definition. This could be an indication of whether the content was displayed within a corresponding viewability range for a threshold period of time (i.e., a binary value). In further configurations, the data value returned to the data management platform 102 may be whether a threshold period of time has been satisfied. Techniques for collecting viewability data are known, and therefore, will not be discussed in further detail herein. Such known techniques can be employed in collecting the viewability data.

The impression data captured via the pixel tag is returned to the data management platform 102. While FIG. 1 shows the impression data being sent from the user device 108 to the data management platform 102, it should be understood that the impression data may first be sent to another component (e.g., the content verification server 104), which then transfers the impression data to the data management platform 102. The impression data, which includes the UUID and corresponding viewability field key-value pairs, can be sent to the data management platform 102 in real-time in order for UUIDs to qualify for traits or segments immediately at the time of content impression exposure. In some configurations, the impression data can be stored in an impression data store 110 with impression data collected from content impressions on multiple user devices.

FIGS. 2A and 2B illustrate collections of viewability data returned with impression data from various content impressions on different user devices. Referring initially to FIG. 2A, each row in the data corresponds with a single content impression. Note also that a single UUID can be exposed to multiple content impressions, so the rows can also correspond to multiple content impressions (alternatively, each content impression for a single UUID can be stored separated). In other words, each row is a record for a content impression or multiple content impressions. For each content impression record, a UUID is identified, and an amount of time the content was displayed on a user device is indicated for each viewability range. FIG. 2B is similar to FIG. 2A. However, the viewability attributes set forth a time threshold of one second. As such, the viewability data in FIG. 2B indicates whether content was displayed for at least one second for each viewability range. While FIGS. 2A and 2B show only a portion of viewability data, additional viewability data and impression data for attributes beyond viewability attributes can be stored with each content impression record, which is one way to differentiate between a single content impression or multiple content impressions.

The data management platform 102 includes a user segmentation component 112 for segmenting users into groups based on at least the viewability data. Generally, the user segmentation component 112 identifies UUIDs with impression data satisfying a segment definition, which sets forth criteria for selecting UUIDs for the user segment. Each criterion in the segment definition specifies a required value for a given attribute. In accordance with embodiments herein, the criteria for a segment definition includes at least one criterion corresponding to a viewability attribute. In instances in which the collected viewability data includes a length of time for each viewability attribute, a criterion may specify a required length of time. For instance, a criterion may specify that content was displayed for at least 0.5 seconds within the 80-89 percent viewability range. In instances in which the collected viewability data indicates whether content was displayed within a corresponding viewability range for a threshold length of time, a criterion may specify that the threshold length of time was satisfied. For instance, a criterion may specify that the threshold length of time was satisfied for the 80-89 percent viewability range. A segment definition can set forth criteria combining any number of viewability attributes and other attributes using Boolean operators (e.g., AND, OR, NOT).

Each content impression record that includes impression data satisfying the criteria set forth by the segment definition is identified. This includes identifying content impression records that include viewability data satisfying at least one viewability criterion specified by the segment definition. The UUID for each of those content impression records that meet the segment definition is identified and added to the user segment. Although there may be multiple content impression records for a given UUID satisfying the segment definition (e.g., the same content was sent to the same user device multiple times), a given UUID is only added once to the user segment. Accordingly, the user segmentation component 112 outputs a set of UUIDs.

By way of example to illustrate, a segment definition could be defined to identify unique users that have been served content impressions in which the content was displayed between 80 percent and 100 percent viewability for at least one second but was not displayed at 0 percent to 79 percent viewability for more than one second. The criteria for the segment definition could be as follows: Viewability_80-89>1 second OR Viewability_90-99>1 second OR Viewability_100>1 second AND NOT Viewability_0-9>1 second AND NOT Viewability_10-19>1 second AND NOT Viewability_20-29>1 second AND NOT Viewability_30-39>1 second AND NOT Viewability_40-49>1 second AND NOT Viewability_50-59>1 second AND NOT Viewability_60-69>1 second AND NOT Viewability_70-79>1 second.

As noted above, segment definitions can set forth criteria associated with other attributes in addition to criteria associated with the viewability attributes. For instance, if a data management platform user wishes to identify a segment of users within a particular geographical region who had content impressions with specific viewability criteria, a segment definition could be used that sets forth a geolocation criteria in addition to the viewability criteria.

A segment definition may also specify a number of impressions with certain criteria in order to define a user segment. For instance, a segment definition could require five content impressions for a given UUID for which the content was displayed in the 70-79 percent viewability range for at least one second. Based on such a segment definition, only UUIDs associated with at least five content impression records with viewability data satisfying the 70-79 percent viewability range for one second would be identified and added to the user segment.

Any number of segment definitions can be set forth. Segment definitions may be default (e.g., predefined by the system) or the data management platform user may specify segment definitions. Segment definitions specified by the data management platform user may be saved, allowing for automatic segmentation using the segment definitions at certain points in time. For instance, a report could be run on a monthly basis to identify a particular segment from the previous month's content impressions. Alternatively, a data management platform user can create an ad hoc segment definition based on desired criteria. Any and all such combinations and variations thereof are contemplated to be within the scope of embodiments herein.

In some embodiments, user segmentation is facilitated by using a number of pre-defined traits. Similar to segment definitions, each trait includes a trait definition setting forth at least one criterion for selecting UUIDs. The traits allow UUIDs to be identified in the background (e.g., as impression data is received for each content impression or on some scheduled basis) by identifying content impressions whose impression data satisfies the trait definition for each trait. For instance, when impression data is received for a content impression, the UUID can be assigned in real-time to any number of pre-defined traits based on which trait definitions are satisfied by the impression data.

By using traits, the impression data for content impressions doesn't need to be stored (i.e., no need for impression data store 110). Instead, the UUID for each content impression is simply associated with the pre-defined traits it qualifies for as the impression data is received. This provides a list of zero or more UUIDs associated with each trait. When traits are used, a segment definition for a user segment can simply identify one or more traits (which can be combined using Boolean operators). Accordingly, the UUIDs for the user segment would include UUIDs identified for the trait(s) specified by the segment definition. Using pre-defined traits in this manner can provide a number of advantages. The amount of storage required can be reduced as the impression data for each content impression doesn't need to be stored. Additionally, the processing required for user segmentation can be decreased and quicker results provided. In particular, there is no need to search through impression data to identify content impressions satisfying a segment definition with various criteria based on attributes. Instead, UUIDs for traits specified by a segment definition are retrieved and combined according to the segment definition.

User segmentation provided by embodiments herein can be used for a variety of different purposes. In some configurations, user segmentation is used to compare conversion rates for different user segments. For instance, the UUIDs for a first user segment can be compared against conversion data identifying UUIDs associated with a conversion (e.g., purchase of a product). A conversion rate is computed based on the percentage of UUIDs from the first user segment that are also identified in the conversion data. A conversion rate for a second user segment can be similarly determined. The conversion rates can then be compared against one another. Any number of user segments can be compared with one another in this manner. In some instances, this can be used to compare a test group user segment against a control group user segment (e.g., media effectiveness studies, true-lift analyses, or view-through analyses). For instance, the test segment could include UUIDs from content impressions based on some range of viewability, and the control segment could include UUIDs for which the content was never displayed. The conversion rate for the test segment could be compared against the conversion rate for the control segment to determine a quantified impact of the content in the market based on an extent to which the test segment conversion rate compares against the control segment conversion rate. Segment definitions can allow for mutual exclusive segment comparisons or comparisons between segments with knowledge that there is UUID overlap depending on what the desired analysis warrants.

Figure 3A:
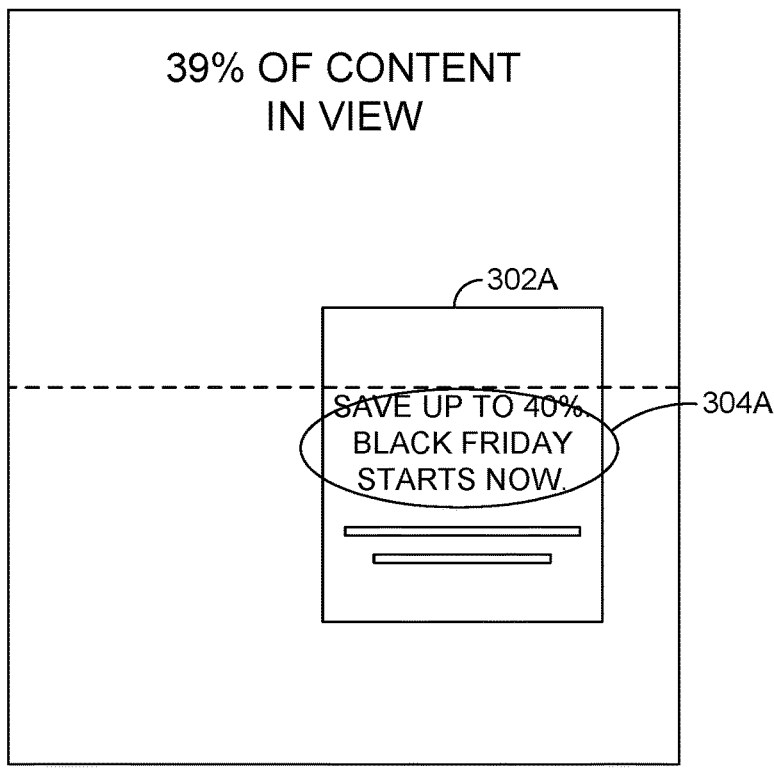
FIGS. 3A and 3B are diagrams illustrating different viewabilities of content displayed on a user device.
Figure 3B:
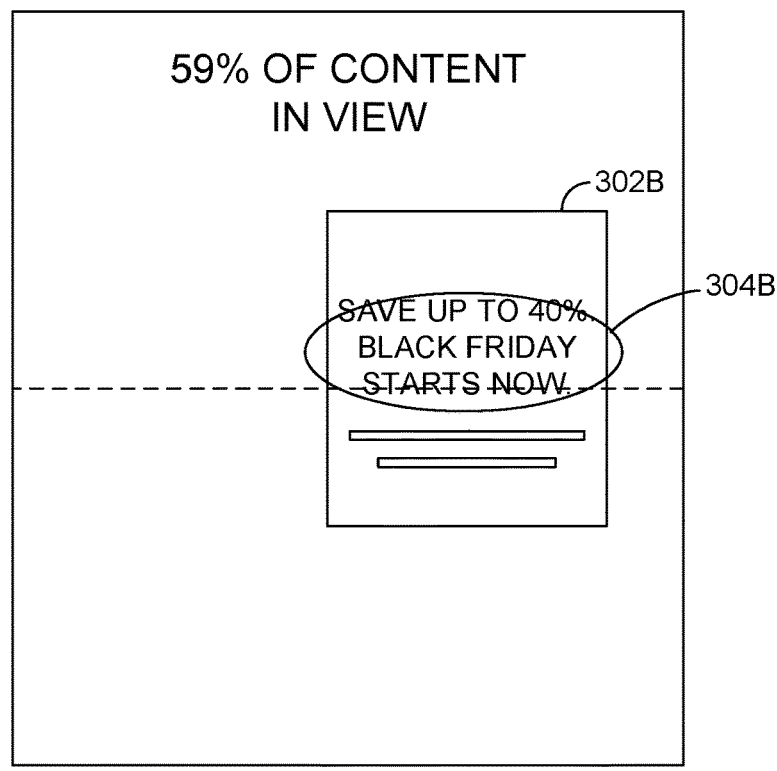

The user segmentation described herein can also be used to evaluate the structure of a marketer's content. For example, FIG. 3A illustrates content 302A that is 39 percent viewable, while FIG. 3B illustrates content 302B that is 59 percent viewable. As can be seen from a comparison of FIGS. 3A and 3B, a promotion "SAVE UP TO 40%. BLACK FRIDAY" 304A is not viewable in FIG. 3A, while the promotion 304B is viewable in FIG. 3B. If a user segment corresponding with 59 percent viewability has a substantially higher conversion rate than that of a user segment corresponding with 39 percent viewability, this could indicate that display of the promotion results in a higher number of conversions. As such, the content can be modified to move the promotion to the top of the content such that it is displayed at lower viewability ranges.

The user segmentation described herein can be used for a variety of further purposes. For instance, a user segment with users having no viewability for the content can be identified, and future content can be purposefully targeted to those users with intention to make sure content impressions are viewable knowing that the users didn't see the content during previous exposures. As another use case example, user segmentation can be used to understand user characteristics that may impact low viewability. More particularly, a user segment can be identified based on low viewability and other attributes (e.g., browser, OS, demographics) associated with the users in that user segment can be analyzed to try to identify attributes that may have led to the low viewability. As a further use case example, user segmentation can be used to identify locations with low viewability for content. More particularly, a user segment can be identified based on low viewability, and the locations at which the content was display for the content impressions for the user segment can be analyzed to identify any common locations.

Regarding content, another use case is the ability to develop new metrics in the data management platform 102 of "True Reach" and "True Frequency" or "Viewable Reach" and "Viewable Frequency." As an example, when three content impressions are served to two different UUIDs each, then the reach is two and the frequency is traditionally recorded as three for each UUID, which could be erroneous if not all three were viewable. But using techniques described herein, it's possible to now determine for UUID A that two impressions were out-of-view, so for this UUID, the True Reach is still one but the True Frequency is two, not three. But for UUID B, the frequency would be one if two impressions were not viewable, for example. In this scenario using the new metrics defined with viewability in mind for the combination for the two UUIDs, the total True Reach would be two at an average True Frequency of 1.5 across both users (UUID A had two while UUID B had one). Whereas, without viewability data, the recorded Reach and Frequency would be two and three, respectively. These metrics can also be used to layer viewability data on top of an image of content and portions within that content that is being served to users and devices. The result is a rendered True Reach for specific portions of the content. For instance, the data management platform 102 could show the True Reach of a promo offer within content is actually half of what was originally thought because a new segment definition based on 0-39 percent viewable was compared to a segment defined by "served impressions" without consideration to viewability. A total unique user/device count against different portions of the content could be provided. For example, the data could yield information that 1.5 MM users saw the marketer's logo only and no other content, while only 1 MM saw the promo offer. The data management platform 102 could recommend creative template revisions by suggesting that moving the promo offer up in the ad unit would increase reach by 500K.

Another use of viewability data could be used to identify media partners delivering out of view impressions in order to achieve better targeting. For instance, a trait or segment could be built of UUIDs that have never received a viewable content impression. That could then be combined that with another trait or segment that represents served impressions by all media partners with the "AND" Boolean operator. This allows for generating media partner-specific segments in the data management platform 102 that represents users that media partners tried to serve viewable content impressions to, but those impressions were measured as being out-of-view. The media partners can then be directed to serve content to those users again. This essentially allows the media partners to have another chance to serve a viewable content impression to those users.

Figure 4:
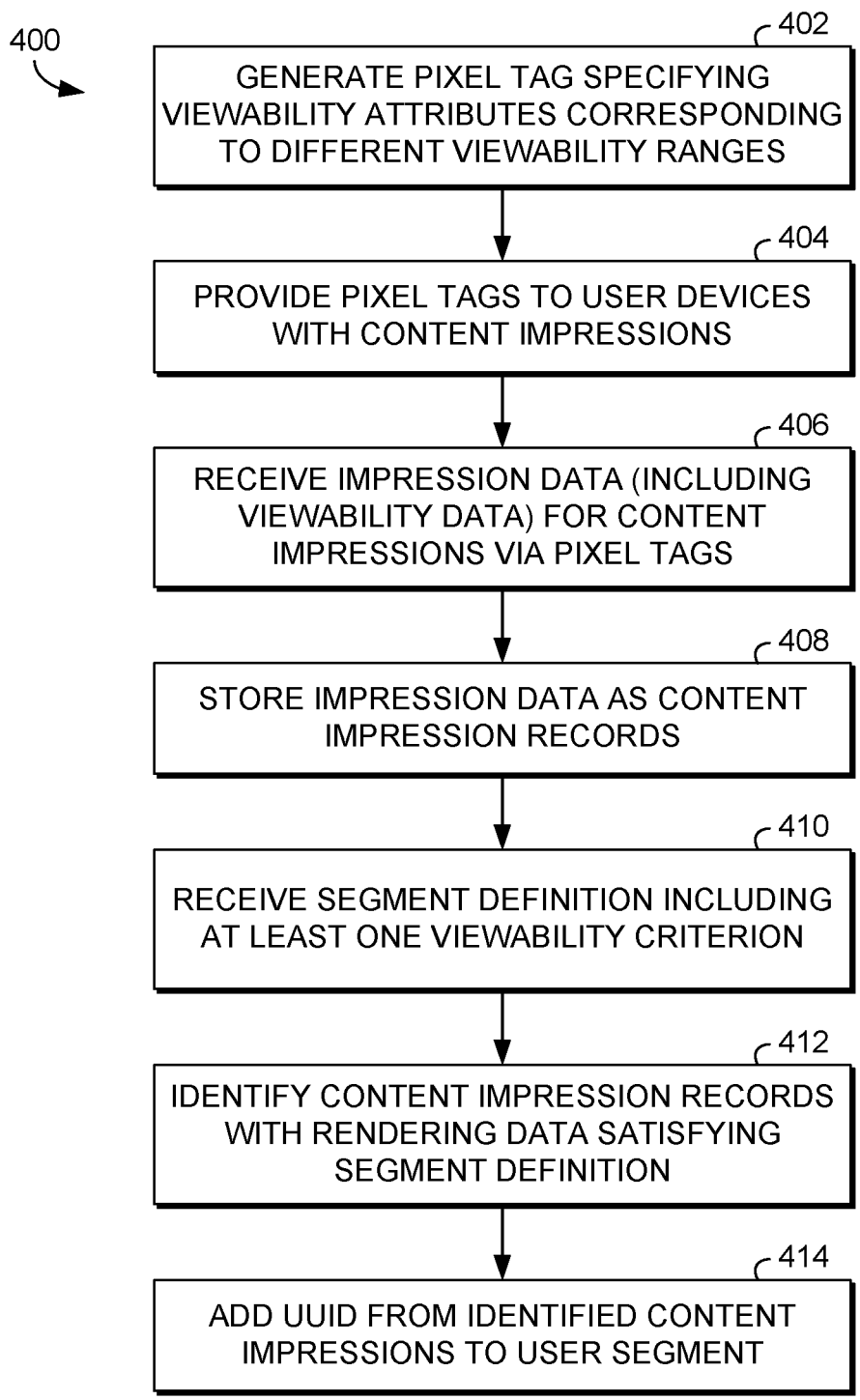
FIG. 4 is a flow diagram showing a method for user segmentation based on viewability data in accordance with some implementations of the present disclosure.

With reference now to FIG. 4, a flow diagram is provided illustrating a method 400 for identifying a customer segment based on viewability data collected via pixel tags. Each block of the method 400 and any other methods described herein comprises a computing process performed using any combination of hardware, firmware, and/or software. For instance, various functions can be carried out by a processor executing instructions stored in memory. The methods can also be embodied as computer-usable instructions stored on computer storage media. The methods can be provided by a standalone application, a service or hosted service (standalone or in combination with another hosted service), or a plug-in to another product, to name a few.

As shown at block 402, a pixel tag is generated specifying viewability attributes corresponding to different viewability ranges. Each viewability attribute sets forth a percentage range of viewability and indicates to record either: (1) a length of time the content is displayed on a user device within the corresponding viewability range; or (2) whether the content is displayed on a user device within the corresponding viewability range for a threshold length of time (e.g., one second). As noted above, the pixel tag may set forth additional attributes beyond the viewability attributes.

The pixel tag is provided to user devices with content for each of a number of content impressions, as shown at block 404. When content is displayed on a user device, the pixel tag is launched, which causes impression data to be collected. Among other things, the collected impression data includes viewability data. The viewability data includes a value for each viewability attribute specified by the pixel tag. The value for each viewability attribute is either: (1) a length of time the content was displayed on a user device within the corresponding viewability range; or (2) whether the content was displayed on a user device within the corresponding viewability range for the threshold length of time set forth by the pixel tag.

The impression data for each content impression is received, for instance, at a data management platform, such as the data management platform 102 of FIG. 1, as shown at block 406. The impression data is stored in an impression data store, as shown at block 408. The impression data includes a record for each content impression that includes a UUID and values for each attribute collected via the pixel tag. This includes viewability data having time values for each viewability attribute set forth by the pixel tag.

A segment definition is received, as shown at block 410. The segment definition sets forth criteria for selecting UUIDs for a user segment. In accordance with embodiments herein, the segment definition includes at least one criterion associated with a viewability attribute to identify a user segment based on viewability.

Each content impression record that includes impression data satisfying the criteria set forth by the segment definition is identified, as shown at block 412. This includes identifying content impression records that include viewability data satisfying at least one viewability criterion specified by the segment definition. The UUIDs for each of those content impression records are identified and added to the user segment, as shown at block 414. Although there may be multiple content impression records for a given UUID satisfying the segment definition (e.g., the same content was sent to the same user device multiple times), a given UUID is only added once to the user segment.

Figure 5:
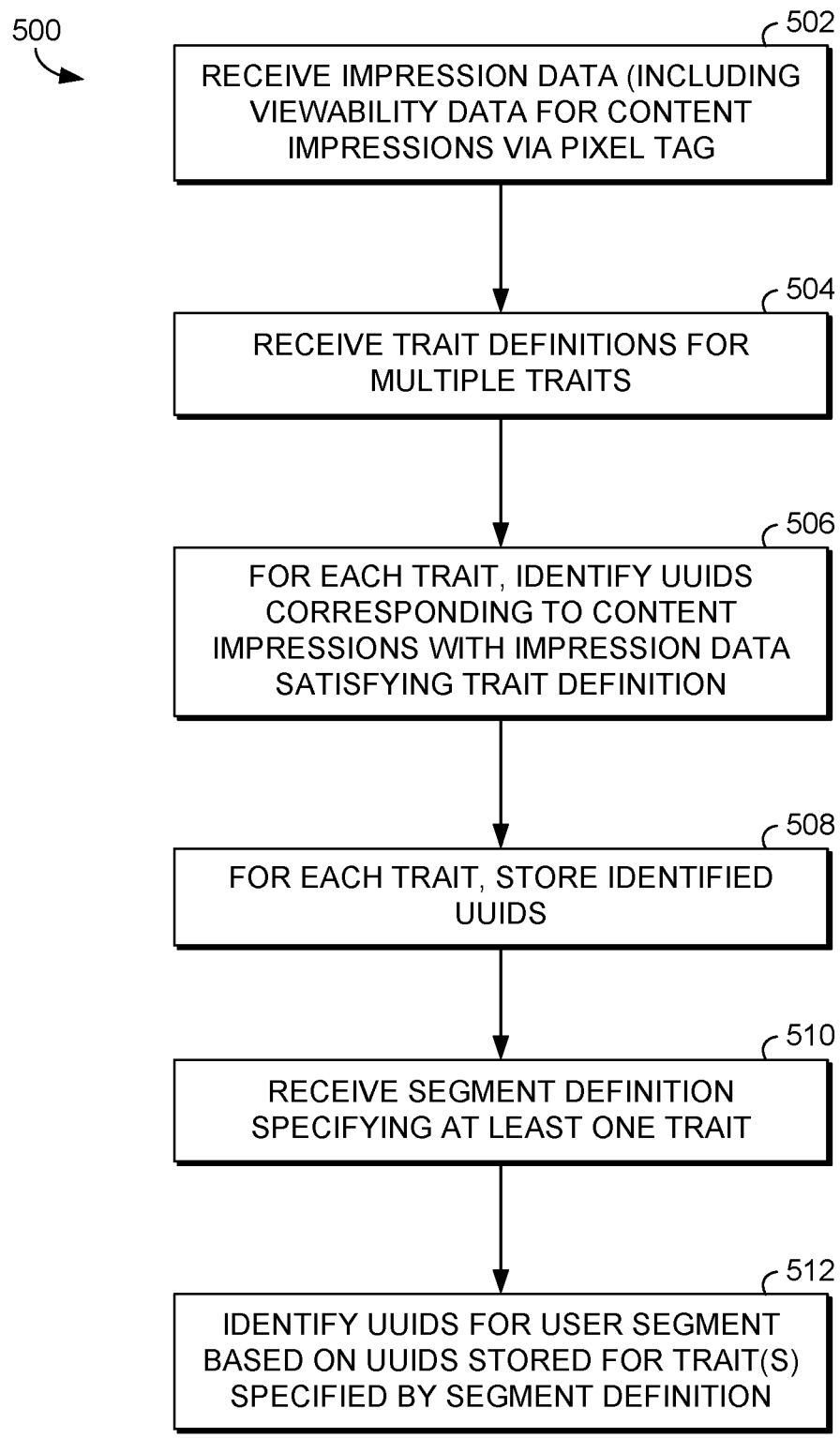
FIG. 5 is a flow diagram showing a method for user segmentation based on viewability data using traits in accordance with some implementations of the present disclosure.

Turning next to FIG. 5, a flow diagram is provided that illustrates a method 500 for using pre-built traits to facilitate identifying user segments. For instance, the method 500 can be used to assign UUIDs to traits in real-time as impression data is received for content impressions. As shown at block 502, impression data is received for each of a number of different content impressions. The impression data may be received, for instance, at a data management platform, such as the data management platform 102 of FIG. 1, in response to pixel tags being launched on user devices during the content impressions. The impression data includes viewability data having values for each of a number of different viewability attributes corresponding to different viewability ranges.

A number of trait definitions for pre-defined traits are received, as shown at block 504. Each trait definition sets forth one or more criterion specifying a required value for a corresponding attribute. For instance, a trait definition could include a criterion specifying that content was displayed in the 40-49 percent range for 0.5 seconds. As another example, a trait definition could include a criterion specifying that content was displayed in the 40-49 percent range for a threshold length of time specified by the attribute corresponding to that viewability range. It should be understood that the criteria for a trait definition can include a single criterion or multiple criteria combined using Boolean operators. The trait definition for some traits could be based on attributes beyond the viewability attributes.

For each trait, UUIDs in content impression records having impression data satisfying the criteria of the trait definition for the trait are identified, as shown at block 506. The UUIDs for each trait are stored, as shown at block 508. This provides information identifying zero or more UUIDs for each trait.

A segment definition for a user segment is received at block 510. The segment definition specifies a trait or a combination of traits using Boolean operators. The UUIDs for the user segment are identified by looking up the UUIDs for each trait specified by the segment definition, as shown at block 512. If only one trait is specified, the UUIDs stored for that trait are identified as the user segment. If multiple traits are specified, the UUIDs stored for each trait are identified and combined according to the Boolean operators. For example, if the segment definition specifies a user segment with trait 1 and trait 2, the UUIDs that are stored for both traits are identified for the user segment. As another example, if the segment definition specifies a user segment with trait 1 and not trait 2, the UUIDs stored for trait 1 that are not also stored for trait 2 are identified for the user segment.

Figure 6:
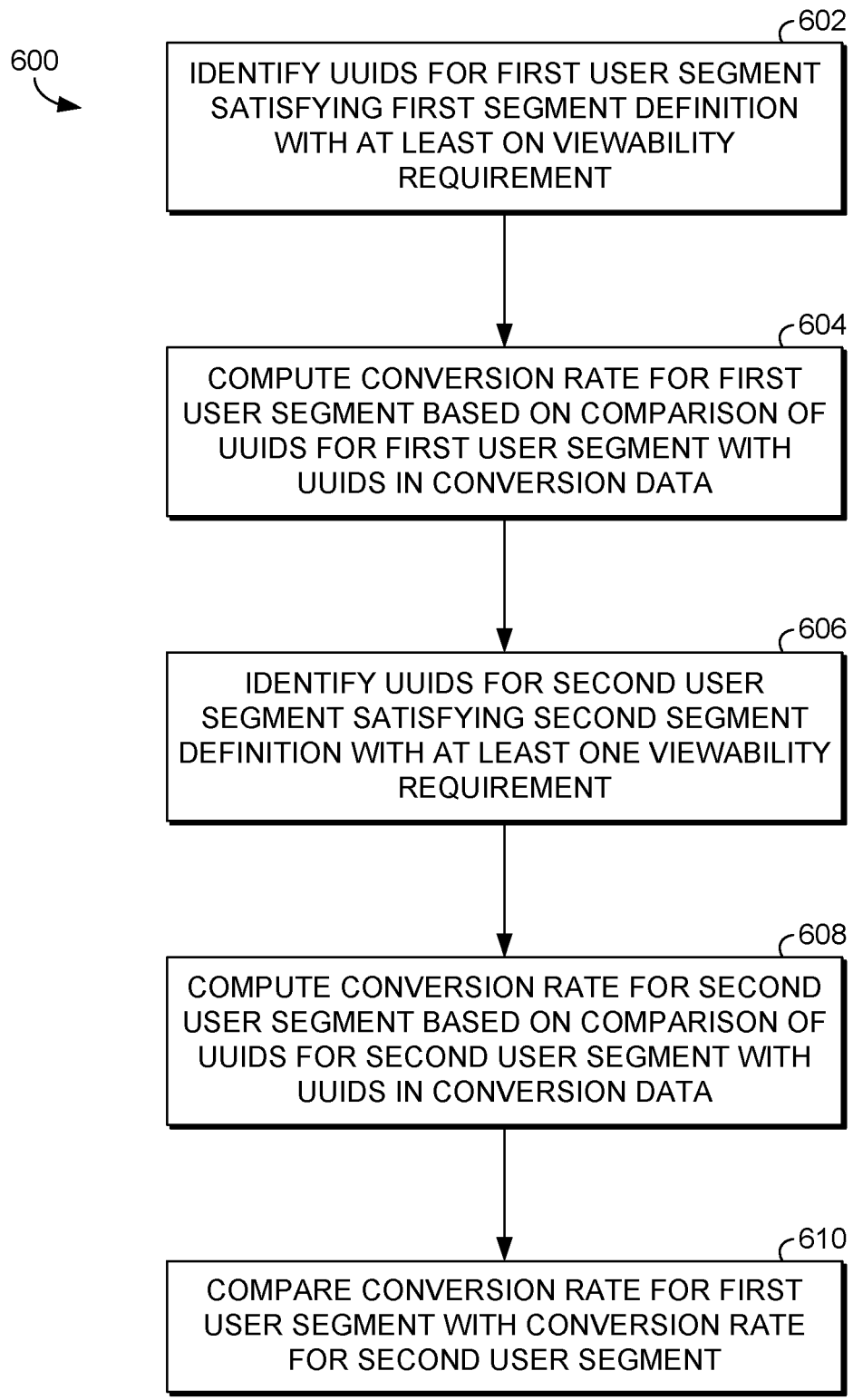
FIG. 6 is a flow diagram showing a method for comparing conversion rates of two user segments in accordance with some implementations of the present disclosure.

Turning now to FIG. 6, a flow diagram is provided illustrating a method 600 for comparing two user segments defined by viewability data. As shown at block 602, UUIDs are identified for a first user segment satisfying a first segment definition that includes at least one viewability requirement as part of its criteria. For instance, the UUIDs can be identified using the method 400 of FIG. 4 or the method 500 of FIG. 5. As shown at block 604, a conversion rate for the first user segment is determined by comparing the UUIDs for the first user segment with UUIDs in conversion data, which stores UUIDs associated with a conversion (e.g., a product purchase). For instance, the conversion rate for the first user segment can be determined as the percentage of UUIDs for the first segment that are also found in the conversion data.

UUIDs are also identified for a second user segment satisfying a second segment definition that includes at least one viewability requirement as part of its criteria, as shown at block 606. A conversion rate for the second user segment is determined at block 608 by comparing the UUIDs for the second user segment with UUIDs in the conversion data. For instance, the conversion rate for the second user segment can be determined as the percentage of UUIDs for the second segment that are also found in the conversion data. The conversion rate for the first segment is compared with the conversion rate for the second segment, as shown at block 610.

Figure 7:
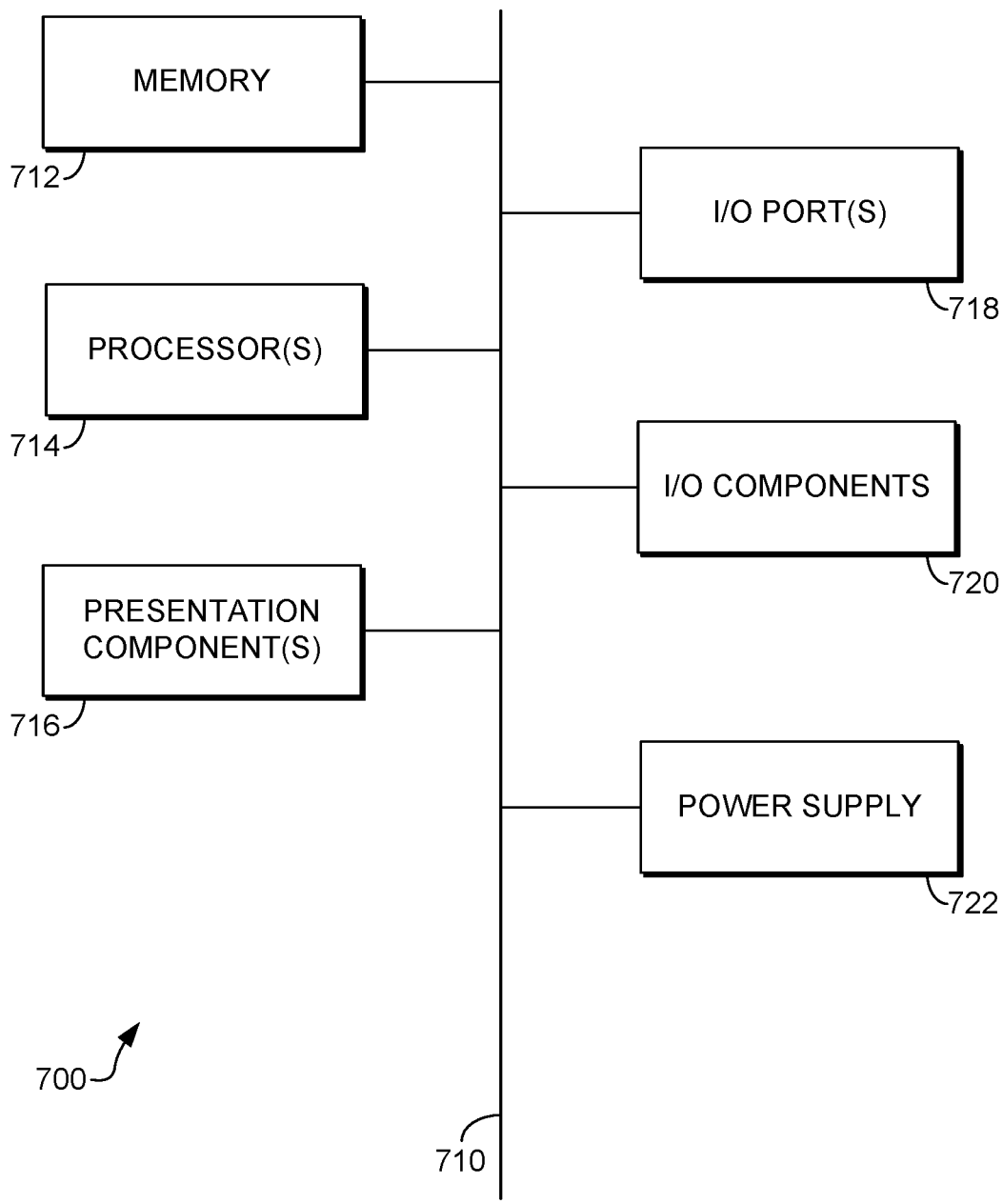
FIG. 7 is a block diagram of an exemplary computing environment suitable for use in implementations of the present disclosure.

Having described implementations of the present disclosure, an exemplary operating environment in which embodiments of the present invention may be implemented is described below in order to provide a general context for various aspects of the present disclosure. Referring initially to FIG. 7 in particular, an exemplary operating environment for implementing embodiments of the present invention is shown and designated generally as computing device 700. Computing device 700 is but one example of a suitable computing environment and is not intended to suggest any limitation as to the scope of use or functionality of the invention. Neither should the computing device 700 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 7, computing device 700 includes bus 710 that directly or indirectly couples the following devices: memory 712, one or more processors 714, one or more presentation components 716, input/output (I/O) ports 718, input/output components 720, and illustrative power supply 722. Bus 710 represents what may be one or more busses (such as an address bus, data bus, or combination thereof). Although the various blocks of FIG. 7 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art, and reiterate that the diagram of FIG. 7 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 7 and reference to "computing device."

Computing device 700 typically includes a variety of computer-readable media. Computer-readable media can be any available media that can be accessed by computing device 700 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 700. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 712 includes computer storage media in the form of volatile and/or nonvolatile memory. The memory may be removable, non-removable, or a combination thereof. Exemplary hardware devices include solid-state memory, hard drives, optical-disc drives, etc. Computing device 700 includes one or more processors that read data from various entities such as memory 712 or I/O components 720. Presentation component(s) 716 present data indications to a user or other device. Exemplary presentation components include a display device, speaker, printing component, vibrating component, etc.

I/O ports 718 allow computing device 700 to be logically coupled to other devices including I/O components 720, some of which may be built in. Illustrative components include a microphone, joystick, game pad, satellite dish, scanner, printer, wireless device, etc. The I/O components 720 may provide a natural user interface (NUI) that processes air gestures, voice, or other physiological inputs generated by a user. In some instance, inputs may be transmitted to an appropriate network element for further processing. A NUI may implement any combination of speech recognition, touch and stylus recognition, facial recognition, biometric recognition, gesture recognition both on screen and adjacent to the screen, air gestures, head and eye-tracking, and touch recognition associated with displays on the computing device 700. The computing device 700 may be equipped with depth cameras, such as, stereoscopic camera systems, infrared camera systems, RGB camera systems, and combinations of these for gesture detection and recognition. Additionally, the computing device 700 may be equipped with accelerometers or gyroscopes that enable detection of motion.

As described above, implementations of the present disclosure relate to user segmentation using viewability data for content. The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. A computer-implemented method for identifying a user segment based on viewability data, the method comprising:
   generating pixel tags for a plurality of content impressions on user devices, each pixel tag setting forth attributes for collecting impression data for each content impression, the attributes including viewability attributes that correspond with a plurality of predefined viewability ranges, the plurality of predefined viewability ranges comprising three or more predefined viewability ranges with each predefined viewability range setting forth a corresponding percentage of an overall displayable area of content that is viewable on a display screen of a user device during a content impression;
   delivering the pixels tag to the user devices for the plurality of content impressions;
   receiving, via the pixel tags delivered for the plurality of content impressions on user devices, impression data for each content impression, the impression data for each content impression comprising a unique user identifier (UUID) and viewability data, the viewability data for each content impression including a time value corresponding to a length of time that associated content was displayed on a user device for each of the plurality of predefined viewability ranges at which the associated content was presented on the user device;
   receiving a segment definition including a criterion specifying a required value for a first viewability range from the plurality of predefined viewability ranges;
   identifying impression data that includes viewability data satisfying the required value for the first viewability range; and
   generating a user segment comprising a set of UUIDs from the identified impression data.

2. The method of claim 1, wherein the time value for each of the plurality of predefined viewability ranges comprises the length of time that the associated content was displayed on the user device.

3. The method of claim 1, wherein the time value for each of the plurality of predefined viewability ranges comprises an indication of whether the length of time that the associated content was displayed on the user device satisfies a threshold length of time.

4. The method of claim 1, wherein the impression data for each content impression includes values for a plurality of other attributes.

5. The method of claim 4, wherein the segment definition includes a criterion specifying a required value for a first attribute from the plurality of other attributes.

6. The method of claim 1, wherein the impression data for each content impression is stored as a content impression record, each content impression record including a corresponding UUID and corresponding time values for each of the plurality of predefined viewability ranges.

7. The method of claim 1, wherein the required value for the first viewability range specified by the criterion comprises a threshold length of time.

8. The method of claim 1, wherein the method further comprises:
   computing a conversion rate for the user segment based on comparison of the set of UUIDs with UUIDs in conversion data;
   identifying a second set of UUIDs for a second user segment based on a second segment definition;
   computing a conversion rate for the second user segment based on comparison of the second set of UUIDs with the UUIDs in the conversion data.

9. One or more computer storage media storing computer-useable instructions that, when executed by a computing device, cause the computing device to perform operations, the operations comprising:
   generating pixel tags for a plurality of content impressions on user devices, each pixel tag setting forth attributes for collecting impression data for each content impression, the attributes including viewability attributes that correspond with a plurality of predefined viewability ranges, the plurality of predefined viewability ranges comprising three or more predefined viewability ranges with each predefined viewability range setting forth a corresponding percentage of an overall displayable area of content that is viewable on a display screen of a user device during a content impression;
   delivering the pixels tag to the user devices for the plurality of content impressions;
   receiving, via the pixel tags delivered for the plurality of content impressions on user devices, impression data for each content impression, the impression data for each content impression comprising a unique user identifier (UUID) and viewability data, the viewability data for each content impression including a time value corresponding to a length of time that associated content was displayed on a user device for each of the plurality of predefined viewability ranges at which the associated content was presented on the user device;
   receiving a trait definition for each of a plurality of traits, the trait definition for a first trait comprising a criterion specifying a required value for a first viewability range from the plurality of predefined viewability ranges
   for each trait, identifying zero or more UUIDs in impression data satisfying the trait definition for each trait;
   receiving a segment definition specifying one or more traits; and
   generating a user segment comprising a set of UUIDs based on UUIDs corresponding to the one or more traits.

10. The one or more computer storage media of claim 9, wherein the time value for each of the plurality of predefined viewability ranges comprises the length of time that the associated content was displayed on the user device.

11. The one or more computer storage media of claim 9, wherein the time value for each of the plurality of predefined viewability ranges comprises an indication of whether the length of time that the associated content was displayed on the user device satisfies a threshold length of time.

12. The one or more computer storage media of claim 9, wherein the impression data for each content impression includes values for a plurality of other attributes.

13. The one or more computer storage media of claim 12, wherein the segment definition includes a criterion specifying a required value for a first attribute from the plurality of other attributes.

14. The one or more computer storage media of claim 9, wherein the impression data for each content impression is stored as a content impression record, each content impression record including a corresponding UUID and corresponding time values for each of the plurality of predefined viewability ranges.

15. The one or more computer storage media of claim 9, wherein the required value for the first viewability range specified by the criterion comprises a threshold length of time.

16. The one or more computer storage media of claim 9, wherein the method further comprises:
   computing a first conversion rate for the user segment based on comparison of the set of UUIDs with UUIDs in conversion data;
   identifying a second set of UUIDs for a second user segment based on a second segment definition;
   computing a second conversion rate for the second user segment based on comparison of the second set of UUIDs with the UUIDs in the conversion data; and
   comparing the first conversion rate to the second conversion rate.

17. A computer system comprising:
   one or more processors; and
   one or more computer storage media storing computer useable instructions to cause the one or more processors to:
   generate pixel tags for a plurality of content impressions on user devices, each pixel tag setting forth attributes for collecting impression data for each content impression, the attributes including viewability attributes that correspond with a plurality of predefined viewability ranges, the plurality of predefined viewability ranges comprising three or more predefined viewability ranges with each predefined viewability range setting forth a corresponding percentage of an overall displayable area of content that is viewable on a display screen of a user device during a content impression;
   deliver the pixels tag to the user devices for the plurality of content impressions;
   receive, in response to the pixel tags being launched on the user devices during the content impressions, a unique user identifier (UUID) and viewability data for each content impression, the viewability data comprising a time value for each of the plurality of predefined viewability ranges at which the associated content was presented on the user device;
   identifying a first set of UUIDs for a first user segment based on viewability data corresponding to each UUID in the first set of UUIDs satisfying a first segment definition; and
   identifying a second set of UUIDs for a second user segment based on viewability data corresponding to each UUID in the second set of UUIDs satisfying a second segment definition.

18. The system of claim 17, wherein the time value for each of the plurality of predefined viewability ranges comprises a length of time that associated content was displayed on a user device.

19. The system of claim 17, wherein the time value for each of the plurality of predefined viewability ranges comprises an indication of whether a length of time that associated content was displayed on a user device satisfies a threshold length of time.

20. The system of claim 17, wherein the instructions further cause the one or more processors to:
   compute a first conversion rate for the first user segment based on a percentage of UUIDs from the first set of UUIDs that are included in conversion data;
   compute a second conversion rate for the second user segment based on a percentage of UUIDs from the second set of UUIDs that are included in the conversion data; and
   compare the first conversion rate to the second conversion rate.

* * * * *